Feb. 9, 1954 F. W. MOFFETT, JR 2,668,506
APPARATUS FOR CONVERTING A HARD FROZEN
CONFECTION INTO A PLASTIC STATE
Filed Dec. 6, 1951 2 Sheets-Sheet 1

INVENTOR.
FRANK WESLEY MOFFETT, JR.
BY Harold E. Stonebraker
his ATTORNEY

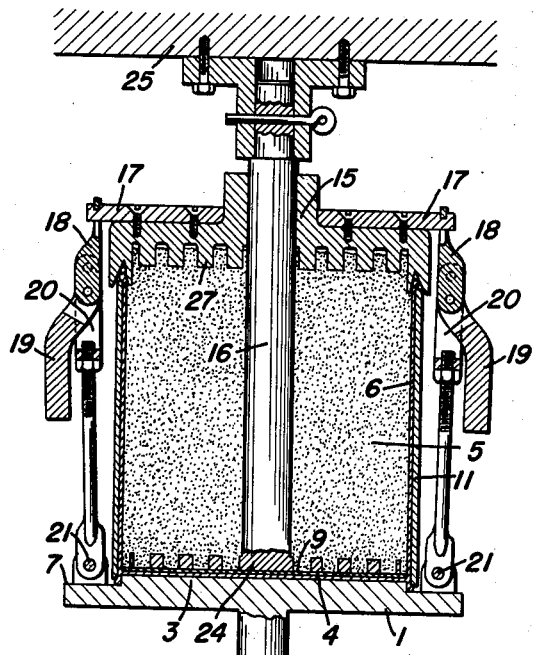

Patented Feb. 9, 1954

2,668,506

UNITED STATES PATENT OFFICE 2,668,506

APPARATUS FOR CONVERTING A HARD FROZEN CONFECTION INTO A PLASTIC STATE

Frank Wesley Moffett, Jr., Chili, N. Y.

Application December 6, 1951, Serial No. 260,244

5 Claims. (Cl. 107—32)

This invention relates to apparatus for converting a frozen confection such as ice cream from a hard state at low temperature into "soft ice cream" or into a plastic state by mechanical pressure applied alternately in opposite directions, and has for its purpose to afford a practical and efficient mechanism for performing such operation on ice cream packaged in a container of cardboard or the like, and converting it quickly while in its original container from a hard state into a soft plastic state by mechanical pressure without fracturing or damaging the cardboard container.

It has been found that such operation reduces the air content of the ice cream and unless some provision is made, the suction or vacuum created as the bottom of the container reverses its movement and travels away from the plunger results in a tendency to suck out and fracture the bottom of the container, and an additional purpose of the invention is to prevent suction acting on the bottom of the container at the moment when the plunger is between the bottom of the container and the main body of ice cream and the bottom of the container starts to move away from the plunger, a particular object of the invention being to obviate fracture of the container by arranging a false bottom in the container that is movable away from the container bottom and acts to avoid damage to the container that might otherwise follow from the suction or vacuum.

The invention has to do with a structure in which a body of ice cream while in its original container is moved back and forth in relation to a fixed perforate plunger causing the ice cream to be moved in opposite directions through and to opposite sides of the plunger, and has for its purpose to afford improved means for supporting the side wall of the cardboard or other container and preventing it from being broken by expansion of the ice cream body laterally during its movement in relation to the plunger.

Another object of the invention is to provide an improved arrangement for holding and locking a metal cover in relation to the ice cream container so that the ice cream can be moved relatively to the plunger in both directions while the ice cream container, a flexible metal side wall surrounding the container, and the cover are all held together on a support as a single unit that is movable back and forth relatively to the plunger, upon opposite sides of which the ice cream is alternately forced during the plasticizing operation.

To these and other ends, the invention consists in the construction and arrangement of parts that will appear clearly from the following description when read in conjunction with the accompanying drawings, the novel features being pointed out in the claims following the specification.

In the drawings:

Fig. 3 is a similar sectional view showing the ice cream package and support at the limit of their upward movement, immediately before starting downwardly;

Fig. 6 is a plan view of the cover;

Fig. 7 is a plan view of the support for the ice cream container;

Fig. 8 is a detail side view of one of the cover clamping elements;

Fig. 9 is an enlarged detail sectional view of a portion of the plunger which engages the container and its surrounding flexible wall;

Fig. 10 is an enlarged detail perspective view of a cardboard container and the removable false bottom intended to be loosely supported on the container bottom, and Fig. 11 is an enlarged detail sectional view through the container and false bottom after ice cream or other frozen mass is packaged therein.

Figure 1:
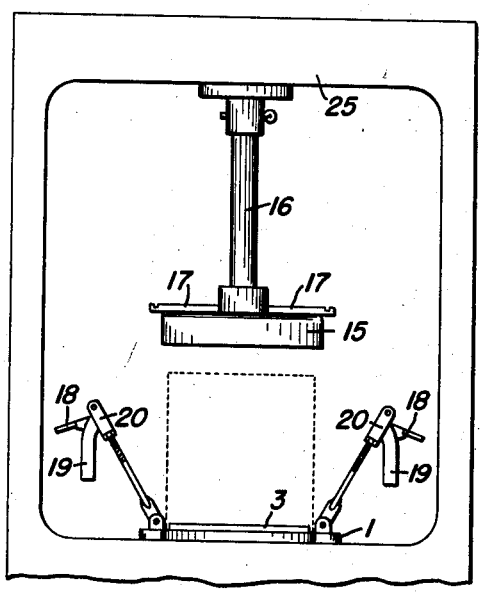
Fig. 1 is a view in side elevation of a mechanism constructed in accordance with a preferred embodiment of the invention and showing the cover clamping elements out of operative position, an ice cream package appearing in dotted lines on the support ready to be attached to the cover.

The present apparatus is in the nature of an improvement over the method and structure disclosed in pending application Serial No. 219,698, filed April 6, 1951, and referring more particularly to the drawings in which like reference numerals refer to the same parts throughout the several views, the structure includes a support 1 mounted on or forming part of a vertically movable rod 2 which is reciprocated by any suitable air pressure or other instrumentalities, not shown and forming no part of the present invention, it being understood that conventional apparatus is utilized for reciprocating the support 1 with the ice cream package mounted thereon and governing such movement either manually for any desired distance or for automatically moving it back and forth through predetermined distances by manual or automatic controls which are well known.

The ice cream or frozen mass package is positioned on the support 1 which includes a central raised portion 3 upon which rests the bottom 4 of a conventional cardboard container in which the ice cream or other frozen mass 5 is packaged, while 6 designates the side wall of the container that extends downwardly somewhat beyond the bottom 4 around the central raised portion 3 and rests against the shoulder 7 of the support while 8 designates a metal fastening ring surrounding the side wall 6 and attaching it to a downwardly turned portion of the bottom 4.

The construction described above is that of a conventional cardboard container such as may suitably be employed for packaging ice cream or other frozen mass. The side wall 6 of the cardboard container is preferably cylindrical and the bottom 4 preferably circular, as usual in this type of construction, while 9 designates a false bottom or disk of cardboard or other suitable material loosely resting on the container bottom 4 and of slightly less size than the bottom 4 so that the disk 9 conforms closely to the side wall 6 but is movable toward and away from the bottom 4 for a purpose that will appear more clearly hereinafter. The false bottom or disk 9 is positioned within the container before inserting the ice cream or frozen mass therein and its purpose is to enable operation of the ice cream plasticizing mechanism without danger of distorting or fracturing the cardboard container which must be preserved intact and protected against the excessive pressures and strains exerted during the plasticizing operation.

Figure 2:
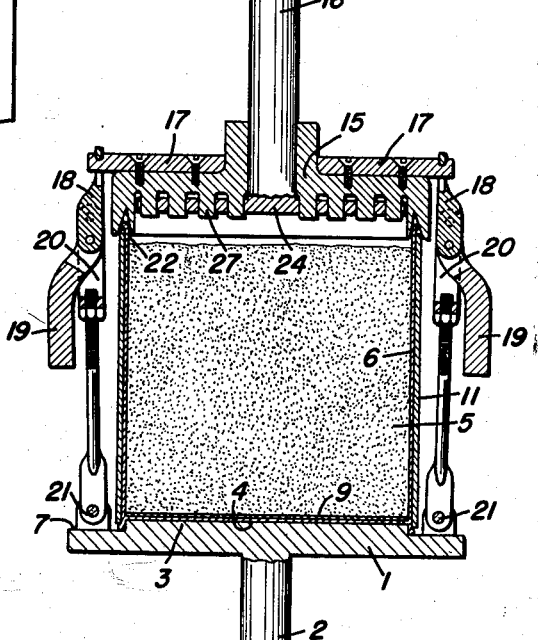
Fig. 2 is a vertical sectional view showing an ice cream package in clamped relation to the cover, previously to its upward movement relatively to the stationary plunger.
Figure 4:
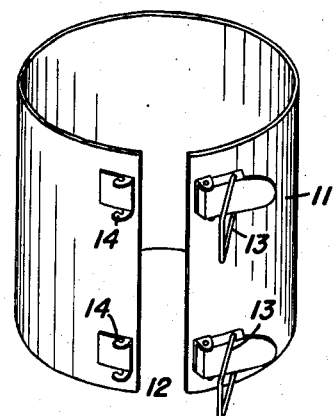
Fig. 4 is a perspective view of the flexible metallic wall which is clamped around the cardboard ice cream container.

In order to protect the side wall of the cardboard container against lateral expansion, there is provided a flexible metallic cylindrical wall or band 11 having separable ends 12, the wall 11 being positionable around the cardboard container with its bottom edge resting upon the metal attaching ring 8, see Fig. 2, and is held in clamping position by suitable clamps 13 pivotally mounted at one end of the flexible wall 11 and engageable with hooks 14 attached to the opposite end of the flexible wall.

When the ice cream package has been placed on the support 1 and the flexible wall 11 has been clamped around the package, the parts of the cardboard ice cream container and flexible wall are in the position illustrated in Fig. 2, following which the support 1 is elevated by a suitable manual control until the upper edge of the container wall 6 and flexible wall 11 are engaged with the cover 15, which is slidable on a vertical post 16 and carries laterally extending bars or arms 17 to receive clamping elements 18 pivoted to clamping levers 19 which are pivoted to the links 20, the latter in turn being adjustable and pivotally mounted at 21 on the support 1.

The cover 15 is of circular formation to conform to the top of the container and flexible wall and includes an annular recess 22 of V-shaped cross-section that engages the inner and outer surfaces of the container wall and flexible wall respectively, while 23 is a rubber or resilient packing ring seated in the recess 22 and engageable with the adjacent surface of the container wall as the cover is clamped thereagainst.

Figure 5:
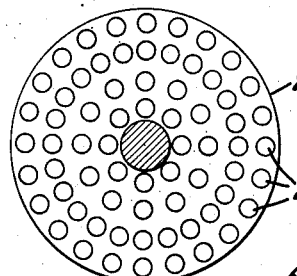
Fig. 5 is a horizontal sectional view of the stationary plunger and plunger post.

24 designates a stationary plunger mounted at the bottom of or forming part of the vertical post 16 which is suitably attached to a fixed part 25, the plunger 24 being provided with a series of circular openings 26, see Fig. 5, through which the ice cream or frozen mass is forced alternately in opposite directions during the reciprocatory movements of the support and ice cream package, and in order to clear the openings in the plunger of ice cream at the end of each cycle, the cover 15 is provided with a series of pins or projections 27 that register with and fit within the openings 26, conforming in shape to such openings so that as the ice cream container and cover are moved downwardly to the limit of their movement with the cover resting on the stationary plunger, as shown in Fig. 2, the pins or projections 27 enter the openings 26 in the plunger and remove therefrom all particles of the frozen mass, which are forced thence downwardly into the container.

With this operation, there is considerable outward pressure upon the side wall of the cardboard container and this is resisted by the metallic flexible wall 11 which surrounds the side wall of the container and effectually prevents any outward expansion or fracture thereof, while at the same time affording tight engagement with the support at the bottom and with the cover at the top of the cardboard package.

Ice cream when frozen contains considerable air which is forced out of the frozen mass as it is broken up and plasticized, thus substantially reducing the volume of the frozen mass, and as a result, when the support and container reach the limit of their upward movement as in Fig. 3 and start downwardly, there is for an instant considerable suction or vacuum created as the bottom of the container starts to move away from the frozen mass, and it has been found that this causes an upward suction of the bottom of the cardboard container, causing the latter to be fractured sufficiently to loosen the bottom and bring about serious leakage of the frozen mass unless provision is made to break such suction or vacuum. This difficulty has been overcome by locating the false bottom 9 loosely on the container bottom beneath the frozen mass. As a result, when the support and container start to move downwardly away from the frozen mass thereabove, any initial vacuum or suction that would otherwise have a tendency to pull the bottom 4 of the container upwardly acts instead on the false bottom 9 which is pulled upwardly a distance of perhaps several inches or more until the suction or vacuum is broken and the frozen mass is forced through the openings 26 in the plunger downwardly toward the bottom of the container, thereby pushing the false bottom 9 downwardly on to the bottom of the container. As a result, the cardboard container is kept intact and effectually protected against fracture that would permit leakage of the contents as the frozen mass becomes more plastic or partially liquid.

The operation of the device briefly is as follows: Assuming the parts to be in the position illustrated in Fig. 1, the cardboard cover is removed from a cardboard ice cream package which is then positioned on the support as illustrated in Fig. 1 in dotted lines with the bottom 4 of the package resting upon the central elevated portion 3 of the support, see Fig. 2. The metal ring 8 rests upon the shoulder 7 of the support, and the flexible wall 11 is then clamped around the cardboard package with its lower edge resting upon the metal ring 8. The support 1 and post 2 are then elevated until the top edge of the wall 6 of the cardboard package and the top edge of the flexible wall 11 are engaged with the V-shaped groove 22 in the metal cover 15 which is then attached to the ice cream package and flexible wall 11 by the clamping elements 18 which are brought into clamping engagement with the arm 17 of the cover, in approximately the relationship shown in Fig. 2. The parts are then ready for operation and the mechanism is set in motion to cause the required vertical reciprocatory movement of the support 1 and ice cream container, causing the ice cream to be alternately moved through openings 26 in the plunger 24 first to the upper side of the plunger during the upward movement of the container and then to the underside of the plunger during the downward movement of the container. As the support and container start their downward movement, any tendency of the suction or vacuum created by such movement pulls the false bottom 9 away from the container bottom 4, but does not affect the container bottom, thus breaking the suction sufficiently to prevent any fracturing of the container itself. The reciprocatory movement of the support and ice cream package is repeated as many times as desired, depending upon the degree of plasticity required, whereupon the vertical movement of the support 1 is stopped, the clamping elements 18 removed from cover 15, and the support 1 and ice cream package lowered away from the cover sufficiently to permit removing the flexible wall 11. The ice cream package can then be removed from the support 1 and is ready for serving or for placing in a service cabinet.

While the invention has been described with reference to the structure shown herein, the apparatus is not limited to this exact disclosure, and this application is intended to cover such modifications or departures as may come within the purposes of the improvements and the scope of the following claims.

I claim:

1. Apparatus for reducing a frozen mass while packaged in a cardboard container from a hard state to a plastic state including a vertically reciprocatory support adapted to receive thereon a cylindrical container filled with a frozen mass, a flexible metallic cylindrical wall with separable ends adapted to be clamped around said cylindrical container with its lower edge resting on the container and support, a metallic cover adapted to engage the upper edge of said container and flexible wall, clamping means carried by the support and engaging said cover acting to hold the latter engaged with the container and flexible wall, and a perforate plunger located beneath the cover, said plunger being stationary in relation to said movable support and said support and container being movable in opposite directions in relation to said stationary plunger.

2. Apparatus for reducing a frozen mass while packaged in a cardboard container from a hard state to a plastic state including a vertically reciprocatory support adapted to receive thereon a cylindrical container filled with a frozen mass, a flexible metallic cylindrical wall with separable ends adapted to be clamped around said cylindrical container with its lower edge resting on the container and support, a metallic cover adapted to engage the upper edge of said container and flexible wall, links mounted on said support, clamping levers pivoted to said links and in locking engagement with said cover, and a perforate plunger located beneath the cover, the plunger being stationary in relation to said movable support and the cover having projections which register with and enter the openings in the stationary plunger, the support and container being movable in opposite directions in relation to said plunger.

3. Apparatus for reducing a frozen mass while packaged in a cardboard container from a hard state to a plastic state including a vertically reciprocatory support adapted to receive thereon a container filled with a frozen mass and having a bottom and a side wall, a container having a false bottom conforming to the container bottom and arranged loosely between the container bottom and the frozen mass, a metallic cover engaging the upper edge of said container, clamping means engaging said cover holding the latter engaged with the container, and a perforate plunger located beneath the cover, said plunger being stationary in relation to said support.

4. Apparatus for reducing a frozen mass while packaged in a cardboard container from a hard state to a plastic state including a vertically reciprocatory support adapted to receive thereon a cylindrical container filled with a frozen mass and having a bottom and a side wall, a container having a circular false bottom slightly smaller in diameter than the container bottom and resting loosely thereon between the container bottom and the frozen mass, a metallic cover engaging the upper edge of said container, clamping means holding the cover engaged with the container, and a perforate plunger arranged beneath the cover, said plunger being stationary in relation to said support.

5. Apparatus for reducing a frozen mass while packaged in a cardboard container from a hard state to a plastic state including a vertically reciprocatory support adapted to receive thereon a cylindrical container filled with a frozen mass and having a bottom and a side wall, a container having a false bottom conforming to the container bottom and arranged loosely thereon between the container bottom and the frozen mass, a flexible metallic cylindrical wall with separable ends clamped around the side wall of said cylindrical container with the lower edge of said flexible wall resting on the container and support, a metallic cover engaging the upper edge of said container and flexible wall, clamping means carried by the support and engaging said cover holding the latter engaged with the container and flexible wall, and a perforate plunger located beneath the cover, said plunger being stationary in relation to said support.

FRANK WESLEY MOFFETT, Jr.

References Cited in the file of this patent

UNITED STATES PATENTS

| Number | Name | Date |
| --- | --- | --- |
| 2,108,418 | Thomas | Feb. 15, 1938 |
| 2,121,564 | Herron | June 21, 1938 |
| 2,266,093 | Stover | Dec. 16, 1941 |
| 2,516,895 | Luterick | Aug. 1, 1950 |